Oct. 3, 1939.    J. C. MEIER    2,174,590
TIRE RETREADING MOLD
Filed Feb. 15, 1937    3 Sheets-Sheet 2

INVENTOR
*J.C.Meier*
BY
ATTORNEY

Oct. 3, 1939.  J. C. MEIER  2,174,590
TIRE RETREADING MOLD
Filed Feb. 15, 1937   3 Sheets-Sheet 3

INVENTOR
J. C. Meier
BY
ATTORNEY

Patented Oct. 3, 1939

2,174,590

UNITED STATES PATENT OFFICE 2,174,590

TIRE RETREADING MOLD

John C. Meier, Stockton, Calif.

Application February 15, 1937, Serial No. 125,725

4 Claims. (Cl. 18—18)

This invention relates to tire vulcanizing molds and particularly to one for recapping purposes.

The principal object of my invention is to provide a mold of this general character having a single one-piece matrix adapted to be used for tires of different sizes, both as to their width and diameter; and so that the tread rubber being vulcanized will be heated evenly over the entire tread area.

A further object is to construct the mold so that it is extremely easy to manipulate with respect to the insertion and removal of the tire, and one which is exceedingly simple and inexpensive in construction.

These objects I accomplish by means of such structure and relative arrangement of parts as will fully appear by a perusal of the following specification and claims.

In the drawings similar characters of reference indicate corresponding parts in the several views.

Figure 1:
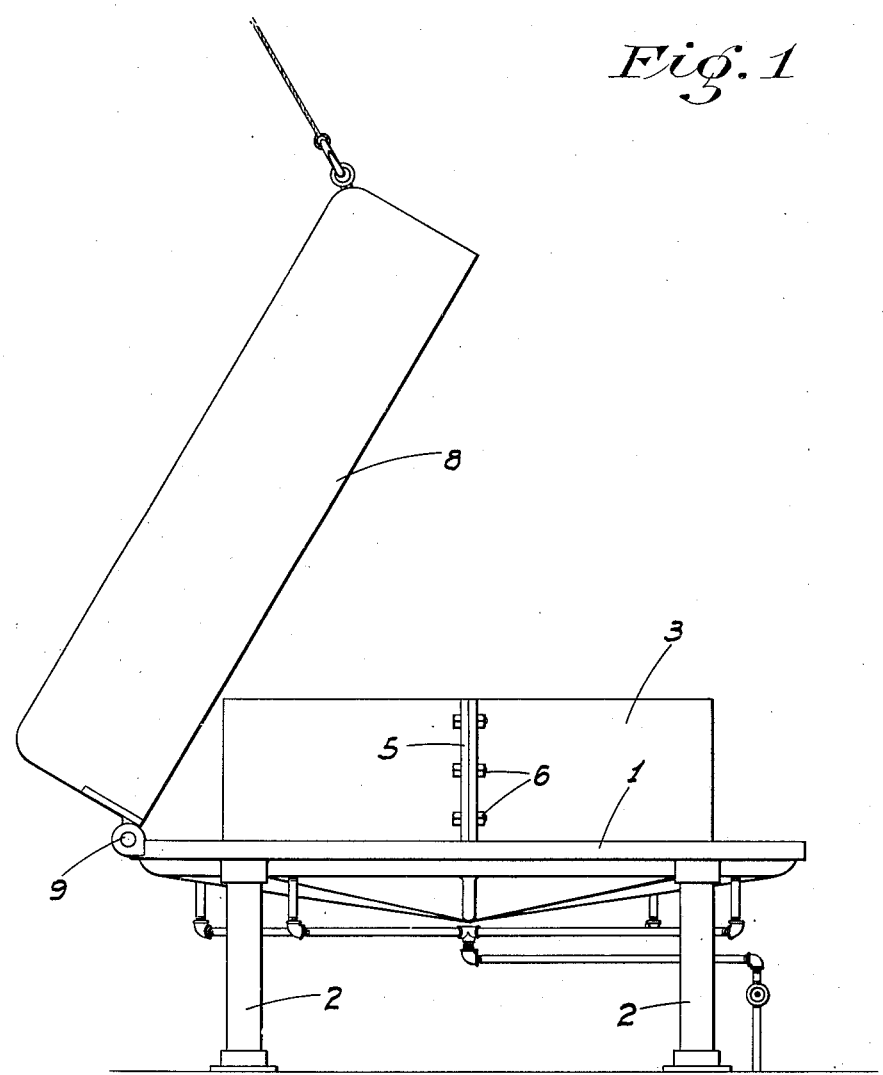
Figure 1 is a side elevation of my improved mold showing the cover member raised.
Figure 2:
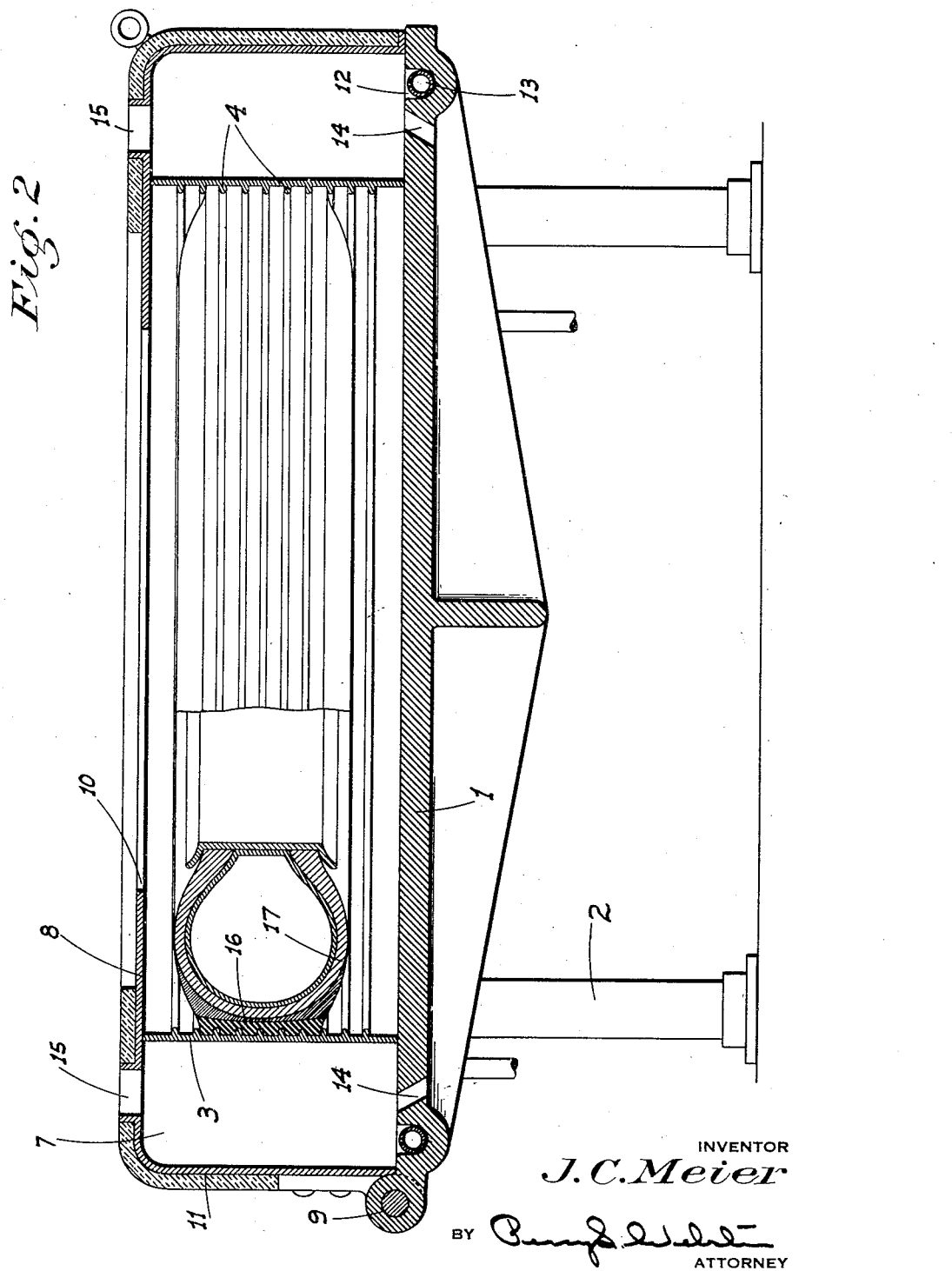
Figure 2 is a sectional elevation of the mold as in operation.
Figure 3:
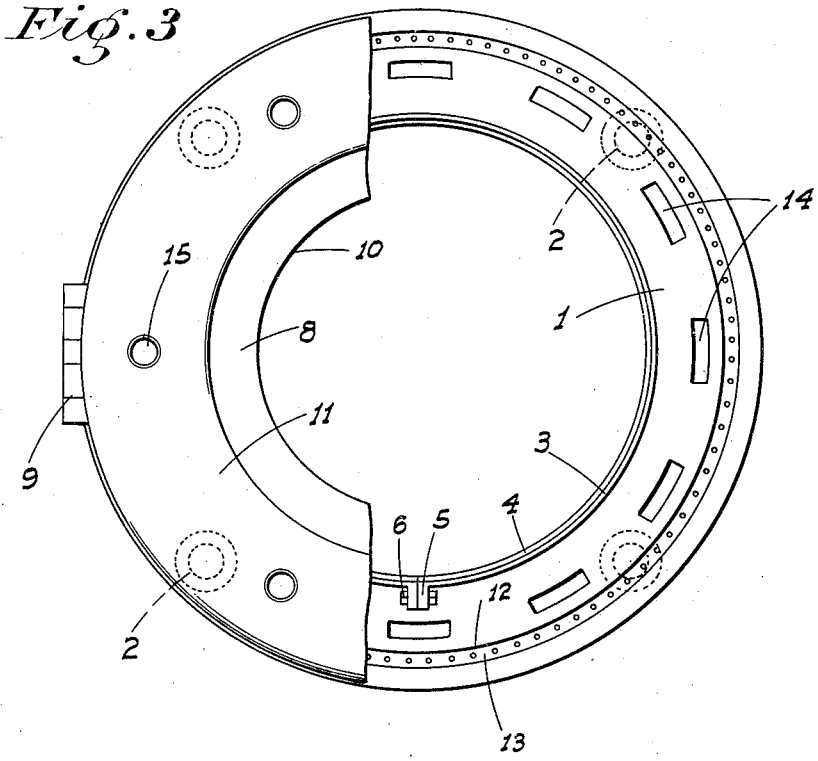
Figure 3 is a top plan view with the cover partly broken away.

Referring now more particularly to the characters of reference on the drawings, the mold comprises a circular base platform 1 forming the bottom of the mold and of considerably greater diameter than that of any tire to be vulcanized. The platform is supported a suitable distance from the floor on legs 2 and is machined on its upper surface so as to be smooth and flat.

Removably supported on and smaller in diameter than the platform is the matrix which is in the form of a one-piece radially split band 3. This band is of relatively thin resilient metal, wider than the cross sectional diameter of any tire to be handled and of approximately the same normal diameter as that of the smallest tire to be handled. The inner surface of the matrix band is formed with any suitable endless tire tread design as at 4. At the split the matrix is formed with outwardly projecting flanges 5 adapted to be releasably drawn together by suitable means such as bolts 6.

The matrix forms the inner wall of a heating chamber 7, the platform outwardly of the matrix forming the bottom of the chamber. The outer wall and top of the heating chamber are formed by the side and top walls of a circular cover 8 which rests on the platform adjacent the rim and is hingedly connected to said platform as at 9. The top of the cover extends over the matrix in close contact with the upper edge thereof and is cut away inwardly of the matrix as at 10 to lighten the same. The side wall as well as the top wall of the cover for the major portion of its extent is provided with a heat insulating jacket 11.

Between the matrix and the cover the platform is provided with a continuous groove 12 of sufficient depth to receive either a continuous electric heating element or a continuous gas jet pipe 13 in completely countersunk relation. When gas is used as a heating means the platform is formed with air intake openings 14 adjacent the gas pipe and the top of the cover is provided with vents 15.

In operation, the tread rubber 16 is first placed on the tire 17 to be vulcanized and the latter is mounted on a rim and placed in the matrix in a deflated condition, the bolts 6 being initially loosened or removed. It may here be noted that the matrix is of a size so that when closed it will just fit about a certain size deflated tire and while it can be used with larger tires it is not intended to be suitable for tires smaller than said certain size. The tire having been placed in the matrix the bolts 6 are tightened to bring the flanges 5 closely together, and the tire is then inflated. This inflation of course increases the diameter of the tire somewhat which forces the tread rubber 16 into close contact with the inner design surface of the matrix.

This operation is preferably carried out on the floor and the matrix and tire are then placed on the platform in a substantially central position thereon, the cover 8 being first raised to expose the platform. The cover is then lowered to form the enclosed heating chamber 7, the air in which is raised to the necessary vulcanizing heat by the operation of the gas burner or other heating element. When the vulcanizing operation is completed, the heat is shut off, and the cover is raised. The matrix and tire therein are then slid off the platform, the smooth and unobstructed surface of the latter facilitating this operation as will be evident.

Figure 4:
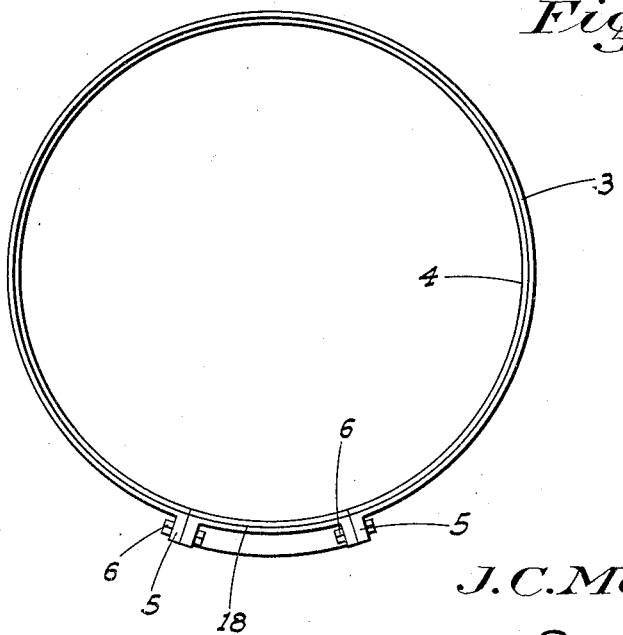
Figure 4 is a top plan view of the matrix detached and shown expanded.

If a larger tire is to be treated, the matrix is expanded about the tire and the necessary increase in circumferential extent is provided by means of a matrix segment 18 of the necessary arcuate extent. This is placed between and bolted to the now separated flanges 5 so as to provide an unbroken tire engaging surface with the matrix proper as shown in Fig. 4. These segments while all the same depth of course may differ in extent, depending upon the particular variation in diameter of the tire from the minimum dimensions. The diameter of the matrix may be increased considerably as long as such diameter is less than that of the heater groove, since there are no fixed parts on the platform or cover which necessarily cooperate with the matrix to prevent or limit an increase in size of the latter. This fact also facilitates manipulation considerably since it is not necessary for the operator to accurately center the matrix on the platform.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A tire mold comprising a flat platform unobstructed about the major extent of its periphery whereby to enable a tire to be slid into position thereon without elevation above the platform, a tire engaging matrix removably supported on and smaller than the platform, a member movably mounted on the platform, and forming, with the matrix and the platform outwardly of the matrix, an enclosed heating chamber, the platform having a relatively long groove depressed in its upper surface within the chamber area, and heating means countersunk in and extending substantially the full length of said groove.

2. A tire mold comprising a platform, a tire engaging matrix removably supported on the platform, a member movably mounted on the platform and forming an enclosed heating chamber with the matrix and the platform outwardly of the matrix, and heating means in the chamber; said member being in the form of a heat insulated cover having a circular vertical wall substantially concentric with the matrix, and a horizontal top wall overhanging and engaging the upper edge of the matrix all about the same.

3. A tire mold comprising a platform, a tire engaging matrix removably supported on and smaller than the platform, a hood movably mounted on the platform and forming an enclosed heating chamber with the matrix and the platform outwardly of the matrix, and a substantially continuous burner element extending about and depressed in the platform outwardly of the matrix and arranged to supply heat to said chamber, the platform having air intake openings spaced radially from the burner element and the hood having a vent outwardly of the matrix.

4. A tire mold comprising a smooth surfaced platform unobstructed from rim to rim, a tire engaging matrix of smaller diameter than the width of the platform slidably mounted thereon and removable therefrom, a hood movably mounted on the platform to form an enclosed heating chamber with the matrix and the platform outwardly of the matrix, and heating means mounted in a fixed position in the chamber independent of the matrix and positioned to avoid interference with the sliding of the matrix onto or off the platform.

JOHN C. MEIER.